United States Patent
Klassen et al.

(10) Patent No.: US 8,631,353 B2
(45) Date of Patent: *Jan. 14, 2014

(54) PREVIEWING A NEW EVENT ON A SMALL SCREEN DEVICE

(75) Inventors: Gerhard D. Klassen, Waterloo (CA); Craig A. Dunk, Guelph (CA); Christopher R. Wormald, Kitchener (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/358,737

(22) Filed: Jan. 26, 2012

(65) Prior Publication Data

US 2012/0179978 A1     Jul. 12, 2012

Related U.S. Application Data

(63) Continuation of application No. 10/784,781, filed on Feb. 24, 2004, now Pat. No. 8,209,634.

(60) Provisional application No. 60/525,958, filed on Dec. 1, 2003.

(51) Int. Cl.
*G06F 3/048* (2013.01)

(52) U.S. Cl.
USPC ........... 715/859; 715/710; 715/736; 715/739; 715/752; 715/753; 715/758; 715/759; 715/837; 715/842; 715/851; 715/861; 715/864

(58) Field of Classification Search
USPC ......... 715/710, 736, 739, 752, 753, 758, 759, 715/837, 842, 851, 859, 861, 864
See application file for complete search history.

(56) References Cited

U.S. PATENT DOCUMENTS

| | | | | |
|---|---|---|---|---|
| 5,617,526 A | * | 4/1997 | Oran et al. | 715/779 |
| 5,793,365 A | * | 8/1998 | Tang et al. | 715/758 |
| 5,872,521 A | * | 2/1999 | Lopatukin et al. | 340/7.52 |
| 5,956,486 A | * | 9/1999 | Hickman et al. | 709/206 |
| 5,960,173 A | * | 9/1999 | Tang et al. | 709/201 |
| 5,990,887 A | * | 11/1999 | Redpath et al. | 715/758 |

(Continued)

OTHER PUBLICATIONS

Ask search qsrc=1 &o=0&1=dir&q=icon+number+correspon Feb. 10, 2013.*

(Continued)

*Primary Examiner* — Boris Pesin
*Assistant Examiner* — John Heffington
(74) *Attorney, Agent, or Firm* — Norton Rose Fulbright Canada LLP

(57) ABSTRACT

Method and apparatus for previewing new events in a computing device having a plurality of applications for managing respective events are described. Individual applications are each represented by an application icon on a screen of a graphical user interface for the device. In response to a new event of a one of the applications, the application's icon is visually modified to notify of the new event. A visual modification may be determined in response to the new event, for example, to preview a content of the event. The visual modification may include a count of all new events that remain to be disposed. On a selection of the visually modified icon, additional previewing may be provided. Activation of the application having a visually modified application icon may be configured to automatically initiate the application at the new event.

12 Claims, 9 Drawing Sheets

(56) References Cited

U.S. PATENT DOCUMENTS

| | | | | |
|---|---|---|---|---|
| 6,131,046 | A * | 10/2000 | Sano et al. | 455/566 |
| 6,169,911 | B1 * | 1/2001 | Wagner et al. | 455/566 |
| 6,346,952 | B1 * | 2/2002 | Shtivelman | 715/758 |
| 6,393,307 | B1 * | 5/2002 | Kim | 455/566 |
| 6,430,405 | B1 * | 8/2002 | Jambhekar et al. | 455/403 |
| 6,434,599 | B1 * | 8/2002 | Porter | 709/204 |
| 6,493,547 | B1 * | 12/2002 | Raith | 455/405 |
| 6,519,629 | B2 * | 2/2003 | Harvey et al. | 709/204 |
| 6,539,421 | B1 * | 3/2003 | Appelman et al. | 709/206 |
| 6,628,194 | B1 * | 9/2003 | Hellebust et al. | 340/7.5 |
| 6,691,159 | B1 * | 2/2004 | Grewal et al. | 709/219 |
| 6,697,840 | B1 * | 2/2004 | Godefroid et al. | 709/205 |
| 6,721,402 | B2 * | 4/2004 | Usami | 379/93.24 |
| 6,725,228 | B1 * | 4/2004 | Clark et al. | 1/1 |
| 6,788,949 | B1 * | 9/2004 | Bansal | 455/519 |
| 6,907,447 | B1 * | 6/2005 | Cooperman et al. | 709/203 |
| 6,965,918 | B1 * | 11/2005 | Arnold et al. | 709/206 |
| 6,970,906 | B1 * | 11/2005 | Parsons et al. | 709/204 |
| 6,981,223 | B2 * | 12/2005 | Becker et al. | 715/753 |
| 6,993,574 | B2 * | 1/2006 | Hall | 709/219 |
| 7,003,279 | B2 * | 2/2006 | Nickum | 455/405 |
| 7,127,685 | B2 * | 10/2006 | Canfield et al. | 715/842 |
| 7,159,192 | B2 * | 1/2007 | Dobronsky | 715/835 |
| 7,275,215 | B2 * | 9/2007 | Werndorfer et al. | 715/752 |
| 7,284,207 | B2 * | 10/2007 | Canfield et al. | 715/842 |
| 7,379,066 | B1 * | 5/2008 | Ostermann et al. | 345/473 |
| 7,386,535 | B1 * | 6/2008 | Kalucha et al. | 1/1 |
| 7,472,351 | B1 * | 12/2008 | Zilka | 715/748 |
| 7,493,573 | B2 * | 2/2009 | Wagner | 715/864 |
| 7,606,866 | B2 * | 10/2009 | Mora | 709/207 |
| 7,631,266 | B2 * | 12/2009 | Werndorfer et al. | 715/752 |
| 7,743,340 | B2 * | 6/2010 | Horvitz et al. | 715/808 |
| 7,813,488 | B2 * | 10/2010 | Kozdon et al. | 379/201.04 |
| 7,900,148 | B1 * | 3/2011 | Canfield et al. | 715/752 |
| 7,921,368 | B2 * | 4/2011 | Moody et al. | 715/751 |
| 8,285,982 | B2 * | 10/2012 | Dobronsky | 713/150 |
| 8,397,205 | B2 * | 3/2013 | Kornerup et al. | 717/100 |
| 8,429,543 | B2 * | 4/2013 | Canfield et al. | 715/752 |
| 8,458,278 | B2 * | 6/2013 | Christie et al. | 709/207 |
| 8,489,146 | B2 * | 7/2013 | Burns et al. | 455/566 |
| 2002/0072039 | A1 * | 6/2002 | Rtischev et al. | 434/157 |
| 2002/0073207 | A1 * | 6/2002 | Widger et al. | 709/227 |
| 2002/0130904 | A1 * | 9/2002 | Becker et al. | 345/753 |
| 2002/0138584 | A1 * | 9/2002 | Fujimoto et al. | 709/206 |
| 2002/0154746 | A1 * | 10/2002 | Usami | 379/88.13 |
| 2002/0160817 | A1 * | 10/2002 | Salmimaa et al. | 455/566 |
| 2003/0011646 | A1 * | 1/2003 | Levine et al. | 345/848 |
| 2003/0052915 | A1 * | 3/2003 | Brown et al. | 345/752 |
| 2003/0131023 | A1 * | 7/2003 | Bassett et al. | 707/200 |
| 2003/0167310 | A1 * | 9/2003 | Moody et al. | 709/206 |
| 2003/0210265 | A1 * | 11/2003 | Haimberg | 345/758 |
| 2004/0056893 | A1 * | 3/2004 | Canfield et al. | 345/753 |
| 2004/0090469 | A1 * | 5/2004 | Moon et al. | 345/846 |
| 2004/0098754 | A1 * | 5/2004 | Vella et al. | 725/135 |
| 2004/0155908 | A1 * | 8/2004 | Wagner | 345/854 |
| 2004/0172455 | A1 * | 9/2004 | Green et al. | 709/207 |
| 2004/0172456 | A1 * | 9/2004 | Green et al. | 709/207 |
| 2004/0225901 | A1 * | 11/2004 | Bear et al. | 713/300 |
| 2005/0038764 | A1 * | 2/2005 | Minsky et al. | 706/47 |
| 2005/0055405 | A1 * | 3/2005 | Kaminsky et al. | 709/206 |
| 2005/0114777 | A1 * | 5/2005 | Szeto | 715/710 |
| 2005/0117733 | A1 * | 6/2005 | Widger et al. | 379/221.05 |
| 2006/0007051 | A1 * | 1/2006 | Bear et al. | 345/1.1 |
| 2006/0084450 | A1 * | 4/2006 | Dam Nielsen et al. | 455/466 |
| 2006/0284787 | A1 * | 12/2006 | Bear et al. | 345/1.1 |
| 2007/0038718 | A1 * | 2/2007 | Khoo et al. | 709/206 |
| 2007/0060206 | A1 * | 3/2007 | Dam Nielsen et al. | 455/566 |
| 2007/0129068 | A1 * | 6/2007 | Ishigaki | 455/414.1 |
| 2007/0195007 | A1 * | 8/2007 | Bear et al. | 345/1.1 |
| 2007/0213099 | A1 * | 9/2007 | Bast | 455/566 |
| 2008/0200215 | A1 * | 8/2008 | De Bast | 455/566 |
| 2008/0220751 | A1 * | 9/2008 | De Bast | 455/414.2 |
| 2008/0282162 | A1 * | 11/2008 | Lincke et al. | 715/710 |
| 2009/0006959 | A1 * | 1/2009 | Kalenius et al. | 715/710 |
| 2009/0106063 | A1 * | 4/2009 | Minsky et al. | 705/7 |
| 2011/0054970 | A1 * | 3/2011 | Minsky et al. | 705/7.37 |
| 2011/0107253 | A1 * | 5/2011 | Levine et al. | 715/781 |
| 2011/0265008 | A1 * | 10/2011 | Levine et al. | 715/738 |
| 2013/0067352 | A1 * | 3/2013 | Canfield et al. | 715/752 |
| 2013/0067353 | A1 * | 3/2013 | Canfield et al. | 715/752 |

OTHER PUBLICATIONS

Ask search qsrc=1&o=0&l=dir&q=message+number+corres Feb. 10, 2013.*
Ask search q=icon+count+correspondent&qsrc=0&o=0&l= Feb. 10, 2013.*
Ask search qsrc=1&o=0&l=dir&q=icon+number+correspon Feb. 10, 2013.*
Ask search qsrc=1&o=0&l=dir&q=message+number+ corres Feb. 10, 2013.*
Bing search q=receive+instant+message+count+ corr Aug. 22, 2013.*
Bing search q=receive+instant+message+count+send Aug. 22, 2013.*
Bing search q=receive+instant+message+number+cor Aug. 22, 2013.*
Bing search q=receive+instant+message+number+sen Aug. 22, 2013.*
Canadian Intellectual Property Office, Examiner's Requisition dated Jul. 27, 2009, issued in respect of Canadian Patent Application No. 2,548,598.
Canadian Intellectual Property Office, Examiner's Requisition dated Dec. 20, 2010, issued in respect of Canadian Patent Application No. 2,548,598.
Canadian Intellectual Property Office, Examiner's Requisition dated Feb. 21, 2011, issued in respect of Canadian Patent Application No. 2,548,598.
Canadian Intellectual Property Office, Examiner's Requisition dated Aug. 1, 2011, issued in respect of Canadian Patent Application No. 2,548,598.
Canadian Intellectual Property Office, Examiner's Requisition dated Mar. 21, 2011, issued in respect of Canadian Patent Application No. 2,727,763.
Canadian Intellectual Property Office, Examiner's Requisition dated Apr. 14, 2011, issued in respect of Canadian Patent Application No. 2,732,050.
Canadian Intellectual Property Office, Notice of Allowance dated Nov. 21, 2011, issued in respect of Canadian Patent Application No. 2,732,050.

* cited by examiner

PREVIEWING A NEW EVENT ON A SMALL SCREEN DEVICE

CROSS-REFERENCE TO RELATED APPLICATION

This application is a continuation of co-pending U.S. patent application Ser. No. 10/784,791, filed Feb. 24, 2004 and entitled "PREVIEWING A NEW EVENT ON A SMALL SCREEN DEVICE", and claims the benefit of U.S. Provisional Patent Application No. 60/525,958 filed Dec. 1, 2003. The entire contents of each of the foregoing, including any appendices, are incorporated by reference.

FIELD OF THE INVENTION

The present invention relates generally to wireless communication devices, and more particularly to graphical user interfaces for controlling such devices.

DESCRIPTION OF THE RELATED ART

With the proliferation of communications services available on wireless mobile devices, it becomes increasingly complex to create a single device that can excel at many different functions. Many critics claim that a wireless telephone device can never make a good handheld personal digital assistant (PDA) device and a handheld PDA device will never make a good wireless telephone. It is also said that only teenagers are using Instant Messaging (IM) services or Short Message Services (SMS) to exchange messages with friends and acquaintances and that such users should get an entirely different wireless mobile device. However, many users of wireless handheld devices desire to have multiple services and functionality on a single device.

Representing multiple services and functions to a user on a single wireless mobile device presents a number of challenges to the designer of a user interface, particularly a graphical user interface (GUI), for controlling the device. Wireless devices are usually small relative to less portable computing devices such as laptops and desktop computers. Inherently then, a visual display such as an LCD or other screen component of the wireless mobile device has a small display area.

Typically, GUIs for wireless mobile devices comprise a main or home screen and one or more sub-screens that may be navigated from the main screen. Notification icons are often rendered on a portion of the main screen to indicate a new event such as the receipt of a new IM message, electronic mail (e-mail) or other service event such as a calendar reminder or alarm and other status information such as time, date and battery life. For each type of service or function available via the device, a graphical image or icon is often rendered on a major portion of the main screen, which icon may be selected using a cursor or other means to launch a specific GUI for the selected service or function.

A user may subscribe to multiple similar services and have these services available via a single wireless mobile device. For example, a user may subscribe to more than one Instant Message-type service, such as AOL™ Instant Messenger (AIM™), ICQ™, Microsoft Network™ (MSN™), Yahoo!™ Messenger and Quick Messaging™. Alternatively or as well, a user may have a corporate and personal e-mail account coupled to the wireless mobile device. When a user is notified of a new event such as a new IM message, the user is required to check each of their IM service applications separately, via their respective activation icons, to determine which IM service is responsible for the new event. Checking each service is inconvenient. Moreover, there is a demand to have information made available to a user quicker than previously available in order to optimize the control of the wireless device.

Accordingly, there is a resulting need for a method and apparatus that addresses one or more of these shortcomings.

SUMMARY

The invention relates to a method, graphical user interface and apparatus for notifying and previewing a new event on a display of a device.

In accordance with a first aspect of the invention, there is provided a method for a computing device having a plurality of applications for managing respective events, individual ones of said applications each represented by an application icon on a screen of a graphical user interface for the device. The method for previewing new events on the screen comprises, in response to a new event of a one of said applications, visually modifying the one of said applications' icon to notify of the new event. In response to the visually modified icon, a user may invoke the one of said applications.

The one of said applications may be monitored to determine an occurrence of the new event. Further, the first aspect may comprise determining a visual modification for the one of said applications' icon in response to the new event; and using said visual modification when visually modifying. Determining a visual modification may comprise maintaining a count of new events for the one of said applications and visually modifying the one of said applications' icon may comprise displaying a preview of a content of the new event. Displaying a preview can be responsive to a user action, such as an interaction with the modified icon. Displaying a preview of a content can comprise displaying a dialog box over a portion of the main screen.

In one embodiment, the method comprises, in response to an activation of the one of said applications having its icon visually modified to notify of the new event, automatically navigating through the one of said applications to the new event.

In one embodiment, the device comprises at least one of a data communication device and a voice communication device and at least some of said plurality of applications manage communications capabilities associated with the device. As such, the events of said at least some of said plurality of applications comprise communication events. For example, the device may be a wireless device.

In a second aspect, in a computing device having a controller coupled to a memory, the memory storing a plurality of applications for managing respective events, there is provided a graphical user interface (GUI) for the applications. The GUI comprises a main screen for displaying on the computing device, the screen comprising a plurality of icons, each icon associated with one of the plurality of applications; at least one monitoring component to determine the occurrence of new events of the applications; and at least one icon modifying component to modify a one of the icons for display on the main screen in response to a new event of the application associated with the one of the icons to notify of the new event.

In a third aspect there is provided a wireless handheld device comprising a controller; a memory coupled to the controller, the memory storing a plurality of applications for execution by the controller to manage respective events and a graphical user interface (GUI) for the applications. The GUI comprises a main screen for displaying on the device, the screen comprising a plurality of icons, each icon associated with one of the plurality of applications; at least one monitoring component to determine the occurrence of new events of the applications; and at least one icon modifying component to modify a one of the icons for display on the main screen in response to a new event of the application associated with the one of the icons to notify of the new event.

BRIEF DESCRIPTION OF THE DRAWINGS

Embodiments of present invention will now be described by way of example with reference to attached figures, wherein.

DETAILED DESCRIPTION

Method and apparatus for previewing new events in a computing device having a plurality of applications for managing respective events are described. Individual applications are each represented by an application icon on a screen of a graphical user interface for the device. When a new event occurs, particularly when the new event relates to a specific one of a plurality of similar applications, the invention provides a convenient way to denote which application relates to the event. In response to a new event of a one of the applications, the application's icon is visually modified to notify of the new event. A visual modification may be determined in response to the new event, for example, to preview a content of the event. The visual modification may include a count of all new events that remain to be disposed. On a selection of the visually modified icon, additional previewing may be provided. Activation of the application having a visually modified application icon may be configured to automatically initiate the application at the new event.

Figure 1:
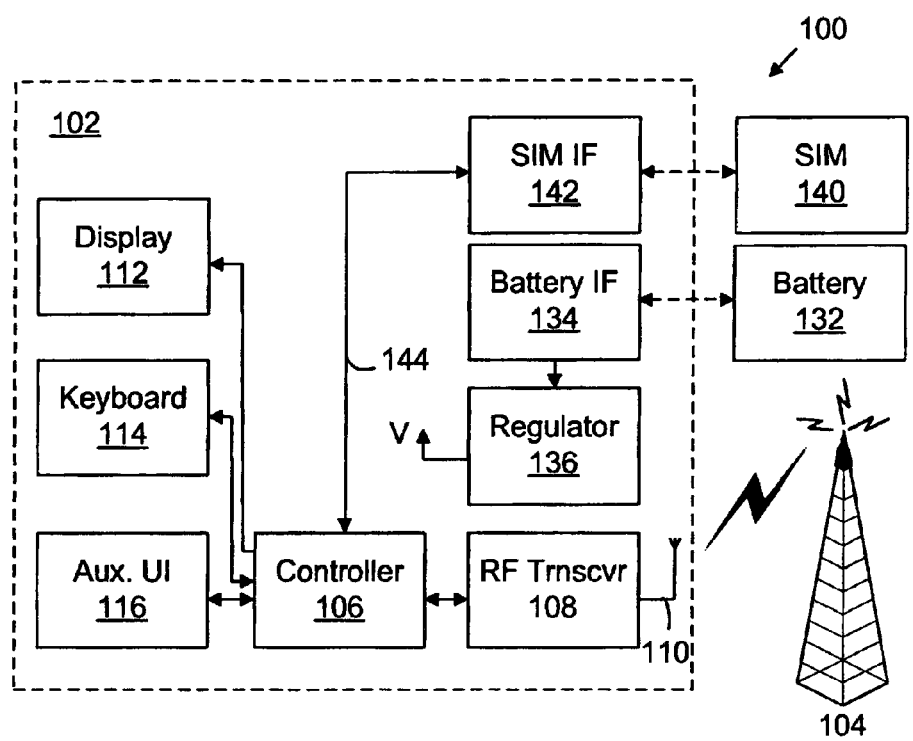
FIG. 1 is a block diagram which illustrates pertinent components of a wireless communication device which communicates within a wireless communication network in accordance with the prior art.

FIG. 1 is a block diagram of a communication system 100 which includes a mobile station 102 which communicates through a wireless communication network 104 symbolized by a station. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from the wireless network 104 over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 which regulates power to the device. When mobile station 102 is fully operational, an RF transmitter of RF transceiver circuitry 108 is turned on only when it is sending to network, and is otherwise turned off or placed in a low-power mode to conserve power. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
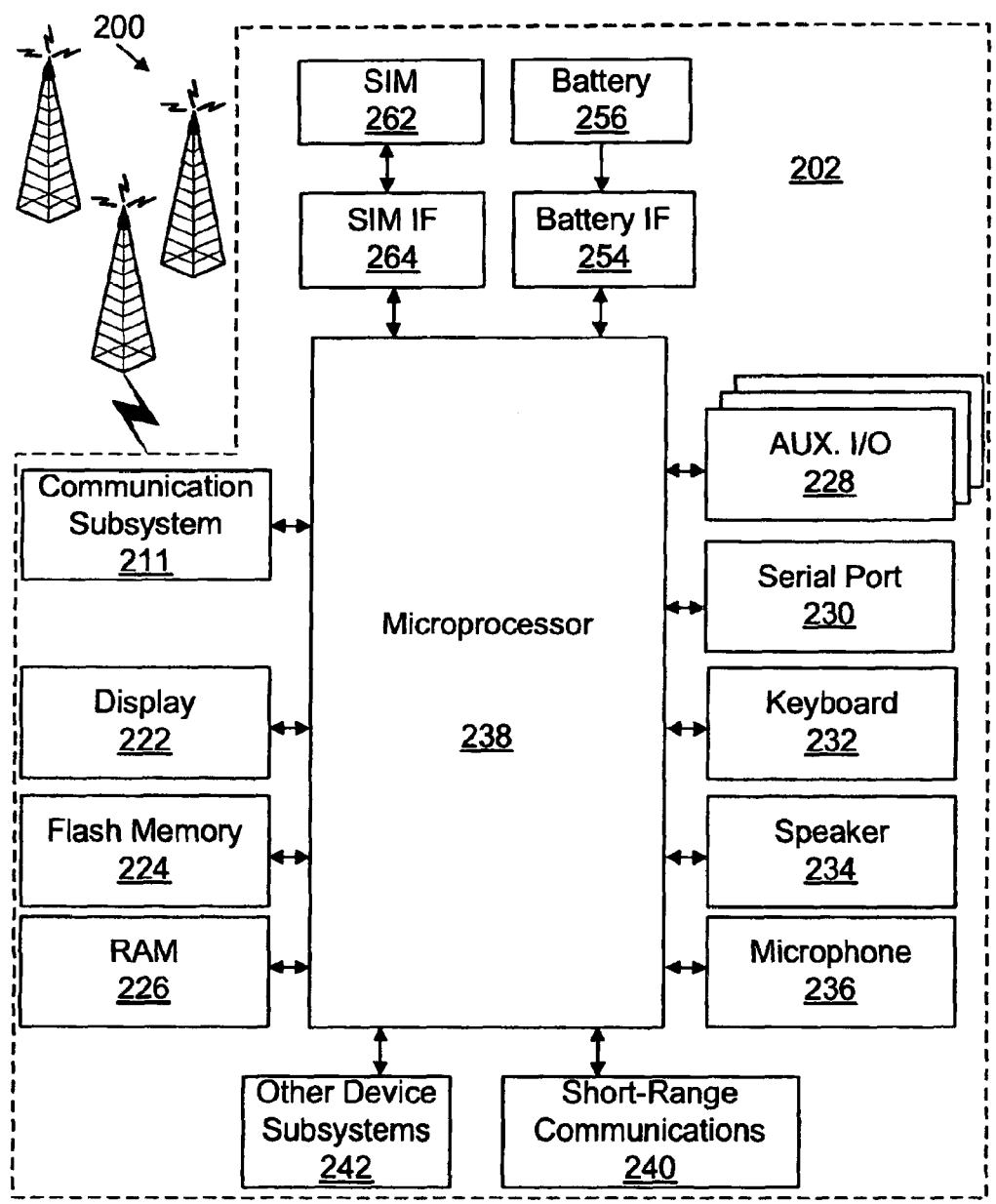
FIG. 2 is a more detailed diagram of a preferred wireless communication device of FIG. 1 in accordance with the prior art.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) for organizing and managing data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both as described further herein below with reference to FIGS. 3-9. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is configured for sending and receiving data items and includes a PIM for organizing and managing data items relating to the user such as, but not limited to, instant messaging (IM), e-mail, calendar events, calendar appointments, and task items, etc. By way of example, mobile station 202 is configured for three instant messaging services and two e-mail services to which the user subscribes. To provide a user-friendly environment to control the operation of mobile station 202, PIM together with the operation system and various software applications resident on the station 202 provides a GUI having a main screen and a plurality of sub-screens navigable from the main screen.

Figure 3:
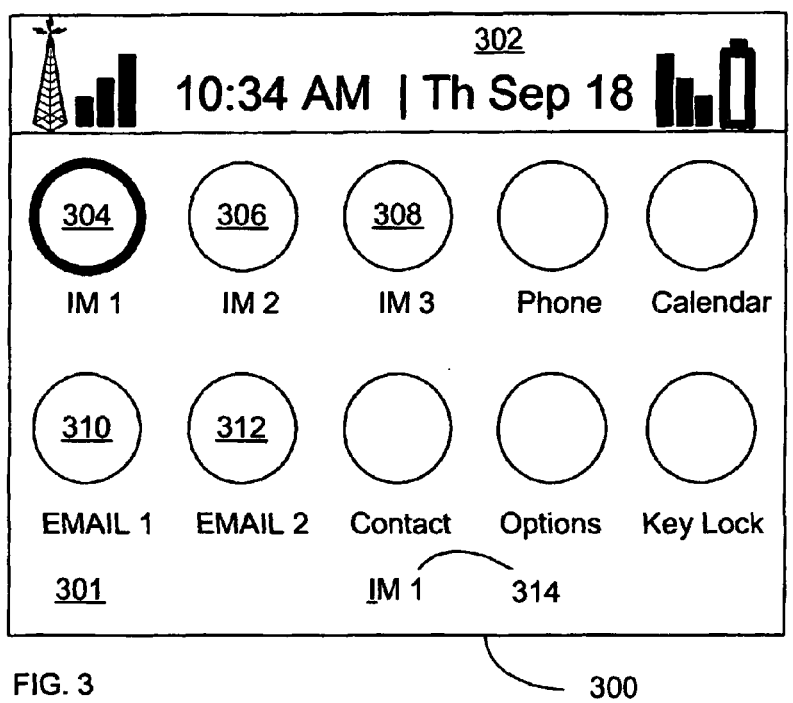
FIG. 3 is an illustration of an exemplary main screen, in accordance with the invention, for a wireless communication device such as the devices of FIGS. 1 and 2.

Referring now to FIG. 3, there is an illustration of an exemplary main screen 300, in accordance with an embodiment of the invention, for a display 112, 222 of mobile station 202 providing a graphical user interface for controlling mobile station 202. Main screen 300 is divided into two main portions, namely an application portion 301 for displaying and manipulating icons (e.g. 304-312) for various software applications and functions enabled by mobile station 202 and a mobile station status portion 302 for displaying status information such as time, date, battery and signal strength, etc. FIG. 3 illustrates three icons 304, 306 and 308 for respective IM applications IM 1, IM 2 and IM 3 and two icons 310, 312 for the two e-mail services Email 1 and Email 2. Associated with each icon is a name (e.g. IM 1) for the application for icon 304. The name may also be presented in a name region 314 of application portion 301.

Main screen 300 may not represent all application icons at once in application portion 301. A user may be required to navigate or scroll through the icons of application portion 301 to view additional application icons.

For simplicity, each icon is represented as a circle but persons of ordinary skill in the art will appreciate that other graphics may be used. In the exemplary main screen and GUI of mobile station 202, when a particular icon, e.g. 304, is selected or made active by a user (such as by manipulating keyboard 232 or other auxiliary I/O device 228), the icon 304 is changed such as by highlighting, shadowing or the like.

In accordance with an embodiment of the invention, an icon (e.g. 304) may be visually modified in response to a new event from the application associated with the icon to provide an immediate notification of the event via a change in main screen 300. The notification may distinguish the icon from icons for similar services to assist a user to control mobile station 202 as described further.

Figure 4:
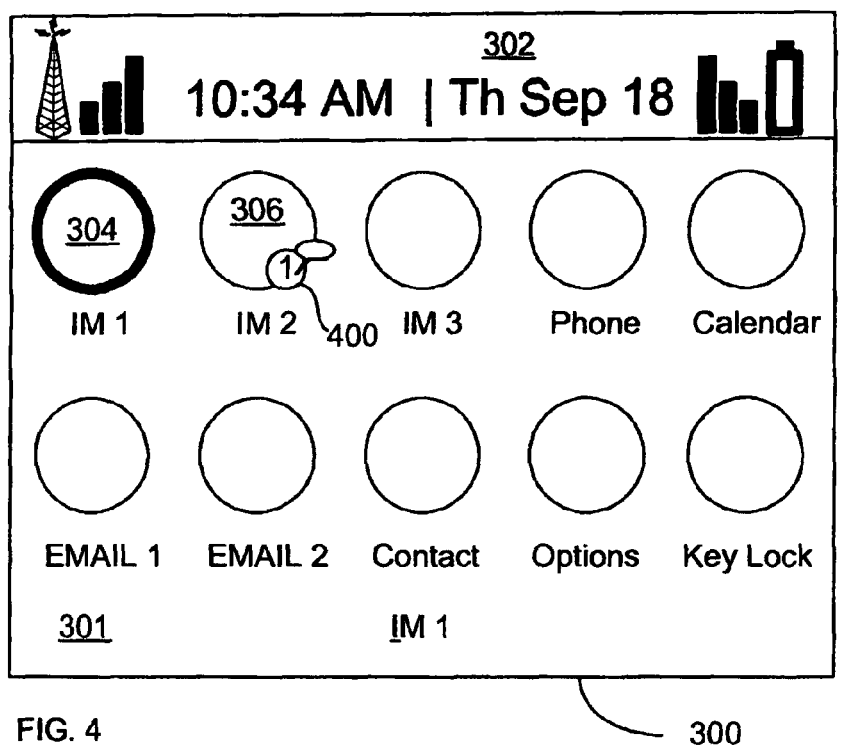
FIG. 4 is an illustration of the main screen of FIG. 3 after a new event.

Each of the icons in the main screen 300 of FIG. 3 is in an initial state indicating no new events have occurred and remain unattended by the user. FIG. 4 is an illustration of the main screen 300 after a new IM event, for example, a new message, has arrived into one of the IM applications, namely IM 2, associated with icon 306. In this exemplary embodiment, the new IM message is indicated with a visual modification 400 comprising a bubble, alluding to new received text, and a numeric indicator "1" representing a count of new events, which in this case are unread messages. Persons of ordinary skill in the art will appreciate that a visual modification 400 different from a bubble may be used and the count may represent other information, such as the number of correspondents or "buddies" from which one or more messages have been received but remain unread. In addition to indicating the number of unread messages, this mechanism may be used to reflect other new event information such as additional state information pertaining to the associated application. State information may include whether the user is currently signed in (and their user name), the state of the connection, and the current state of the user (away vs. available). In an e-mail application, such as associated with one of icons 310, 312, a count may be of unread e-mail messages or distinct senders of unread e-mail. Similar counts may represent SMS messages, appointments, alarms or other events for respective applications.

Optionally, the count may be configurable for each application or instance thereof. For application icon 304 it may identify the number of distinct senders of unread IM messages and for application icon 308 distinct unread IM messages.

Figure 5:
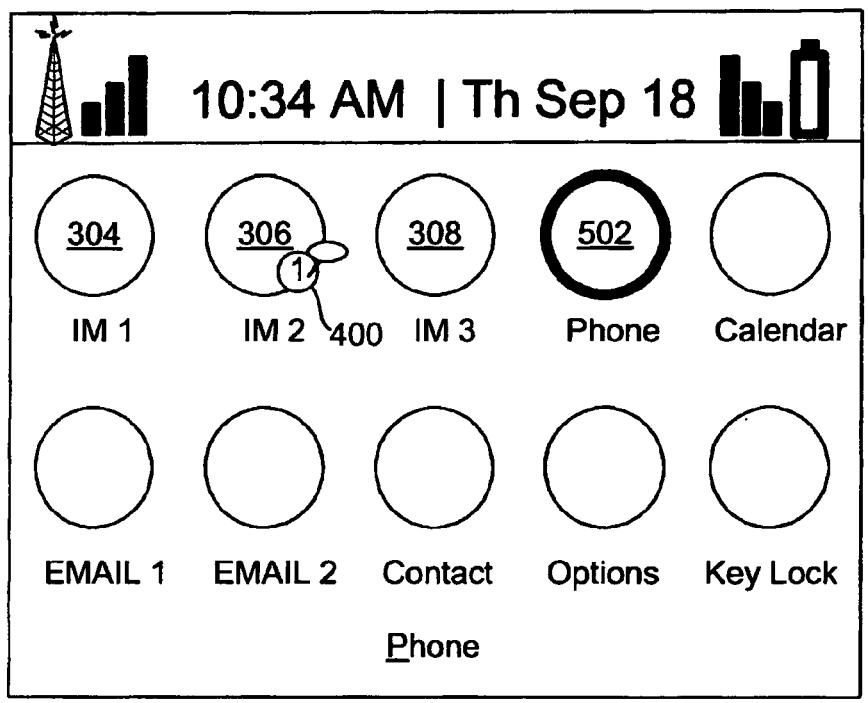
FIG. 5 is an illustration of the main screen of FIG. 4 following a user action.

FIG. 5 shows an IM application icon 306 following a user action. When the user of mobile station 202 moves the focus of main screen from icon 304 through 306 and 308 to highlight phone icon 502, visual modification 400 persists at icon 306 to maintain the visual modification and remind the user of the unread message. Preferably, only once the user activates an application and reads the unread message is the visual modification changed, for example, to decrease the count and, if applicable, remove the modification if the count is zero.

Figure 6:
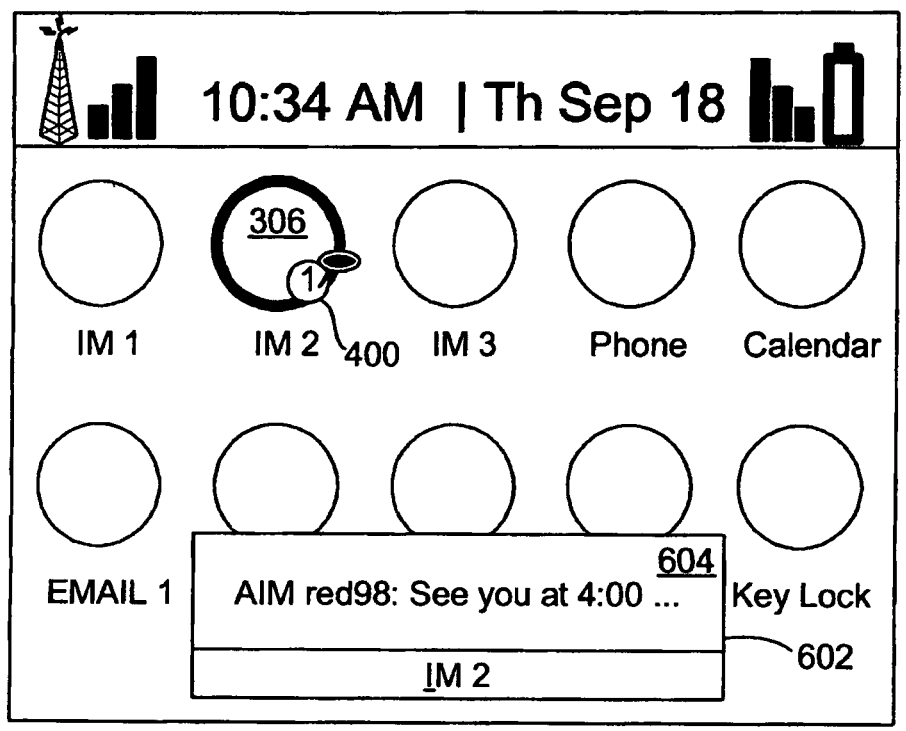
FIG. 6 is an illustration of a change to an IM application icon when the user selects the application icon with the new event.

FIG. 6 is an illustration of main screen 300 when IM application icon 306 having an unread message is highlighted. Upon selection of icon 306, in addition to highlighting the icon, a dialog box 602 comprising a message preview 604 of at least a portion of the unread message is displayed. The opening of the dialog box 604 may be briefly delayed after icon 306 is brought in focus by the user. If a dialog box is opened too quickly as a user navigates among the icons, navigation may be preempted before the user navigates to a particular icon of choice. Dialog box 604 is opened at name region 314 though persons skilled in the art will recognize that another region may be selected to position the dialog box 604. By way of example, message preview 604 in dialog box 602 shows the application service (i.e. "AIM" for AOL Instant Messenger) the correspondent sending the message (i.e. "red98") and a part of the unread message (i.e. "See you at 4:00 . . . ").

Figure 7:
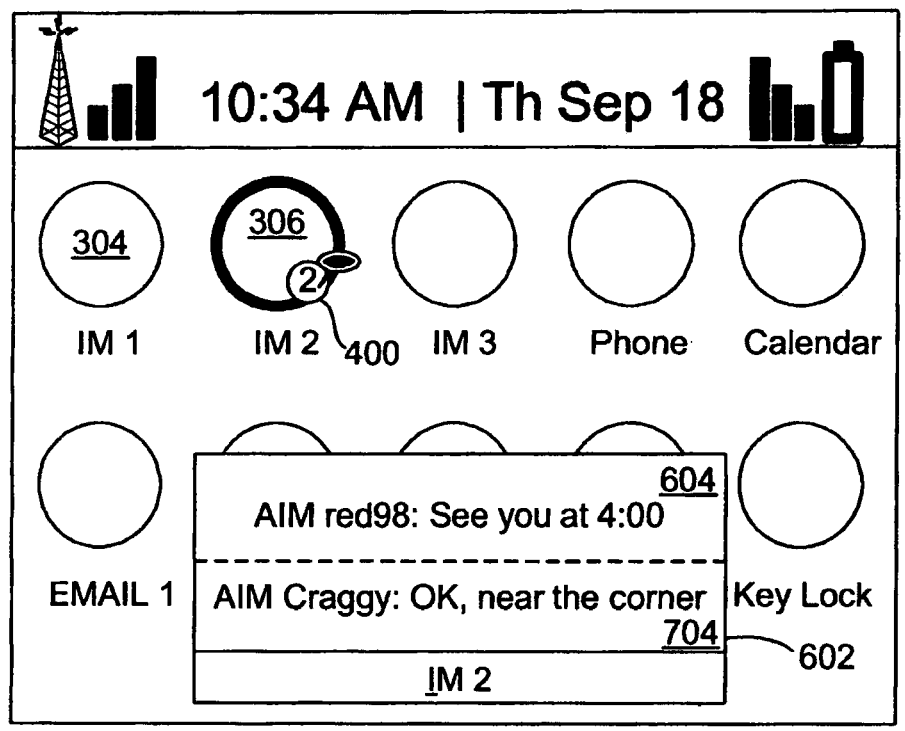
FIG. 7 is an illustration of multiple new events within one application.

FIG. 7 shows a dialog box 602 for an IM application 306 having two unread messages indicated at visual modification 400. Dialog box 602 comprises message previews 604 and 704. Due to the inherent size of main screen 300 and other considerations apparent to those skilled in the art, there is an upper limit to the number of unread messages that may be previewed in such a manner. This limit may be optionally configurable by a user within a predetermined range or simply configured to a maximum size based on the available screen space, font, etc.

Optionally, in accordance with an embodiment of the invention, a user may be enabled to "jump" (i.e. automatically navigate) to the unread message directly from the application icon on the main screen, eliminating any intervening screens that may normally be navigated to read messages when navigating the GUI for the associated application. For example, highlighted icon 306 may be activated as per normal (e.g. selecting "enter" on keyboard 232) and the application initiated to start at an unread message (e.g. most or least recent). The application's initial screen or buddies list may be skipped. The opportunity to "jump" may be time-limited and enabled only for a short period of time immediately following the occurrence of the new event, such as from about a few seconds to about 30 seconds. The "jump" activation anticipates the user's need to see the unread message.

Figure 8:
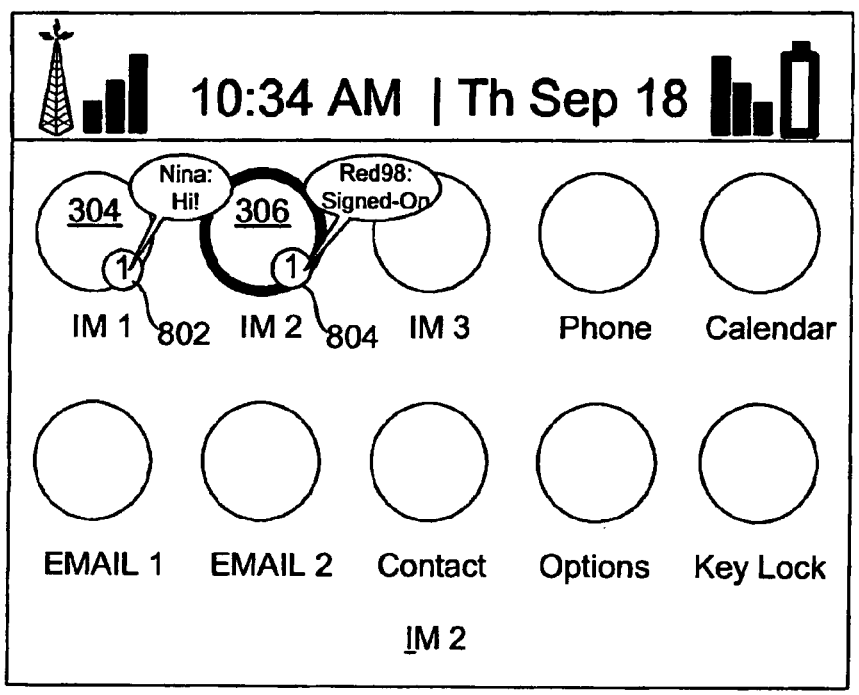
FIG. 8 is an illustration of further embodiments for previewing new events on the main screen.

FIG. 8 is an illustration of another embodiment for previewing events on a main screen of a mobile station such as station 202. In this embodiment, two new events, one for each of IM application icons 304, 306 are indicated via respective visual modifications 802 and 804. Visual modification 802 comprises an event count, namely a count of unread messages and a message preview providing a sender identity and a portion of the unread message. Similarly though differently modification 804 comprises an event count and state preview indicating IM correspondent buddy "Red98" has signed on. Persons of ordinary skill in the art will appreciate that different events may be visualized on the main screen in accordance with the invention and these events may depend upon the associated application. However, options may be selectively configurable.

Figures 9A, 9B:
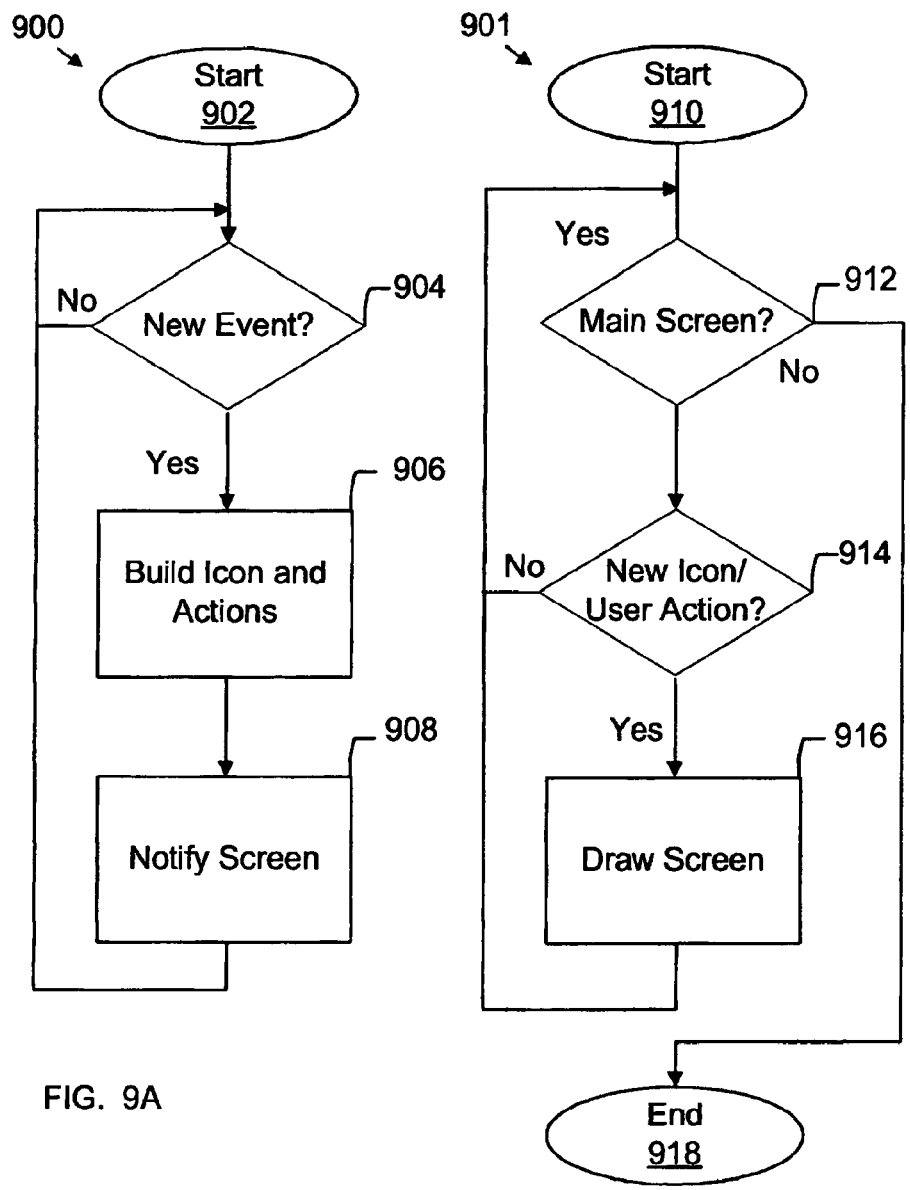
FIGS. 9A and 9B are flowcharts which describe a method in accordance with the invention.

FIGS. 9A and 9B are flowcharts which describe a method in accordance with the invention for the visual modification of an application icon to represent a new event. FIG. 9A represents operations 900 for identifying a new event to determine the modification and FIG. 9B represents operations 901 to display the modification.

Operations 900 may be enabled for a service or other application such as IM, e-mail, etc. Though not shown events to be monitored (for example, by a monitoring component of the GUI) and visually indicated (for example, by a icon modifying component) upon occurrence are pre-determined in accordance with a type or types of events to be notified and previewed. For example, for operations 900 for use in accordance with 1M, whether the count is to count distinct unread messages or senders is pre-determined.

Beginning at a start block 902 of FIG. 9A, operations 900 commence and the application represented by the application icon to be modified is monitored for a new event (step 904). Persons of ordinary skill in the art will understand that monitoring may be implemented in a number of fashions depending, in part, on operating system and other system services and the interface between communication subsystem 211 and microprocessor 238. Each of the plurality of applications to be monitored may have a dedicated monitoring component to determine the occurrence of respective new events. Alternatively, a single monitoring component could monitor each of the applications. Monitoring may be continuously or intermittently performed repeating step 904, until a new event is determined.

Upon a new event, at step 906, the visual modification to the icon to be changed is determined by an icon modifying component. The counter, if any, is incremented and any visual element or graphic to be overlaid may be configured. For example, text may be obtained for the overlay as exemplified by visual modification 802 of FIG. 8. The counter may be decremented if the monitored event is the reading of a previously unread message, for example.

User actions that may be performed in association with the modified icon may be set up. For example, text for a dialog box may be obtained in advance and associated with the visual modification for use when the icon is highlighted on the main screen by the user. Should the icon be activated to initiate the application, data to facilitate an immediate automatic jump to the most recent unread message may also be determined in advance if necessary, and associated with the visual modification. The sender of the message may be identified and various user action options prepared for that sender. For example, actions to permit a phone call, e-mail, SMS or other selectable message may be presented to a user highlighting an icon having a visual modification.

At step 908, the visual modification and any associated data, as applicable, is identified to a main screen maintenance portion of the PIM GUI or other application responsible for maintaining the main screen as described further with reference to operations 901. The notification may pass an object or other data sharing mechanism to provide the modification and any associated action data. Thereafter, monitoring continues at step 904 of operation 900. Monitoring may continue for as long as station 202 is powered.

Beginning at step 910, operations 901 commence for main screen maintenance. At step 912 operations monitor to determine that the main screen is active. If yes, operations monitor for a user action or a notification of a visual modification to an icon (step 914). Upon such an occurrence, a new screen is drawn reflecting the visual modification of an icon or the user's action (step 916, via Yes branch). Exemplary user actions are moving the focus or cursor over the icons of a main screen to highlight an icon or activating an application associated with the icon. The highlighting of an icon that was previously visually modified may further initiate a dialog box display requiring the drawing of the main screen as described above. Once the screen is drawn at step 916 or if no new icon or user activity is detected at step 914, operations 901 repeat at 912. At step 912, if the main screen is no longer active, for example because a user has navigated to another screen, operations 901 may cease (step 918 via No branch) until the main screen is reactivated (not shown).

Operations 900 illustrate a method aspect of an embodiment of the invention monitoring events of a single application. As will be understood to those of ordinary skill in the art, mobile station 202 may be configured to have multiple monitors, one for each application, or a single monitor configured to monitor all applications for new events. Alternatively, each type of application could have a monitor for monitoring respective instances of the application type. For example, a single monitor could be configured for monitoring the three IM applications of the above-described embodiment, a further monitor may be configured for the two e-mail applications, a further for the phone application, etc.

While operations 910 are illustrated as waiting to be advised of a new visual modification, other initiation mechanisms could be employed. For example, each application or respective monitor therefor could be queried for new visual modifications.

Though operation 900 and 901 are described with reference to new events, persons of ordinary skill in the art will appreciate that modifications may be incorporated therein to expire the preview of a new event and display a default or other icon for an application. For example, with reference to FIG. 8, icon 804 illustrates a status event preview, namely the sign-on of Red98. This preview may be expired automatically after a predetermined period of time. A standard or default icon could be used to replace the preview icon. Alternatively, a modified preview icon could be used such as one indicating a count of new events. Similarly, it may be desired to persist some new event previews information even upon the happening of subsequent new events for the same application. For example, new event information relating to a status of the associated application, (e.g. sign-in/out status, availability etc.) may be persisted even as new events occur and are previewed.

The above-described embodiments of the present application are intended to be examples only. Those of skill in the art may effect alterations, modifications and variations to the particular embodiments without departing from the scope of the application. The invention described herein in the recited claims intend to cover and embrace all suitable changes in technology.

The invention claimed is:

1. A method of providing notification of instant messages on a wireless communication device, the wireless communication device having a graphical user interface displayed on a display of the wireless communication device, the method comprising:
 displaying at least one icon associated with an instant message application on the graphical user interface of the wireless communication device;
 receiving a plurality of instant messages on the wireless communication device, the plurality of instant messages including messages from a plurality of different messaging correspondents;
 in response to receiving at least one of the plurality of instant messages, visually modifying the at least one icon associated with an instant message application to generate an additional portion to notify a user of the received instant message; and
 in response to a user-activation of the instant message application associated with the visually modified icon, displaying a dialog box, the dialog box including a plurality of messaging entries, each messaging entry associated with a different messaging correspondent including at least one correspondent from whom a plurality of messages have been received, and each messaging entry displaying at least a portion of an instant message and an identifier for the associated messaging correspondent.

2. The method of claim 1, wherein the plurality of messaging entries are displayed as a vertical listing.

3. The method of claim 1, wherein each messaging entry further displays an associated application service.

4. The method of claim 1, wherein at least one displayed instant message is an unread message.

5. The method of claim 1, wherein the dialog box displays a maximum predetermined number of messaging entries at one time.

6. The method of claim 5, wherein the maximum predetermined number of messaging entries is user configurable.

7. The method of claim 5, wherein the maximum predetermined number of messaging entries is based upon available screen space.

8. The method of claim 7 further comprising:
 in response to receiving at least one of the plurality of instant messages, displaying a preview of at least one of the at least one of the plurality of instant messages, the preview being displayed in a dialog box and including at least of portion of the at least one of the at least one of the plurality of instant messages.

9. A wireless communication device for providing notification of instant messages, the wireless communication device comprising:
 a processor;
 a display electrically coupled to the processor, the display presenting a graphical user interface; and
 a medium or media including machine-readable instructions executable by the processor to:
  display at least one icon relating to instant messaging on the graphical user interface;
  receive a plurality of instant messages, the plurality of instant messages including messages from a plurality of different messaging correspondents;
  in response to receiving at least one of the plurality of instant messages visually modify the at least one icon relating to instant messaging to generate an additional portion to notify of the new event; and
  in response to an activation of the at least one icon relating to instant messaging having its icon visually modified to notify of the new event, displaying a dialog box, the dialog box including a plurality of messaging entries, each messaging entry associated with a different messaging correspondent including at least one correspondent from whom a plurality of messages have been received, and each messaging entry displaying at least a portion of an instant message and an identifier for the associated messaging correspondent.

10. The wireless communication device of claim 9 further comprising:
 in response to receiving at least one of the plurality of instant messages, displaying a preview of at least one of the at least one of the plurality of instant messages, the preview being displayed in a dialog box and including at least of portion of the at least one of the at least one of the plurality of instant messages.

11. A non-transitory computer-readable media comprising stored electronic data structures representing executable instructions which, when executed by a processor of a wireless communication device, cause the wireless communication device to:
 display at least one icon relating to instant messaging;
 receive a plurality of instant messages, the plurality of instant messages including messages from a plurality of different messaging correspondents;
 in response to receiving at least one of the plurality of instant messages visually modify the at least one icon relating to instant messaging to generate an additional portion to notify of the new event; and
 in response to an activation of the at least one icon relating to instant messaging having its icon visually modified to notify of the new event, display a dialog box, the dialog box including a plurality of messaging entries, each messaging entry associated with a different messaging correspondent including at least one correspondent from whom a plurality of messages have been received, and each messaging entry displaying at least a portion of an instant message and an identifier for the associated messaging correspondent.

12. The computer readable media of claim 11 further comprising executable instruction which, when executed by the processor of the wireless communication device, cause the wireless communications device to:
 in response to receiving at least one of the plurality of instant messages, display a preview of at least one of the at least one of the plurality of instant messages, the preview being displayed in a dialog box and including at least of portion of the at least one of the at least one of the plurality of instant messages.

* * * * *